No. 631,703. Patented Aug. 22, 1899.
B. W. DUNN.
SHRAPNEL SHELL.
(Application filed Dec. 16, 1898.)

(No Model.)

Witnesses:
H. S. Rohrer
Nellie Callahan

Inventor:
Beverly W. Dunn
by W. H. Finckel
Atty.

UNITED STATES PATENT OFFICE.

BEVERLY W. DUNN, OF THE UNITED STATES ARMY, ASSIGNOR TO THE SCOVILL MANUFACTURING COMPANY, OF WATERBURY, CONNECTICUT.

SHRAPNEL SHELL.

SPECIFICATION forming part of Letters Patent No. 631,703, dated August 22, 1899.

Application filed December 16, 1898. Serial No. 699,448. (No model.)

*To all whom it may concern:*

Be it known that I, BEVERLY W. DUNN, a captain of the United States Army, stationed at Frankford Arsenal, Philadelphia, in the county of Philadelphia and State of Pennsylvania, have invented a certain new and useful Improvement in Shrapnel, of which the following is a full, clear, and exact description.

Present ordnance practice requires that the balls in a shrapnel shell must not have any relative motion during the flight of the projectile, and they should not be deformed either by the pressure to which they are subjected in firing or by the action of the bursting powder charge. Any relative movement, such as the balls not taking up rotation of the shell, would prevent accurate flight of the shrapnel, and a deformation of the balls would make their shape irregular and greatly interfere with, if not wholly prevent, their accurate flight after the bursting of the shrapnel. The present practice is to pack the balls in cast-iron separators having individual sockets therefor and also to pile them into the shrapnel or shell and then support them therein by means of sulfur or resin melted and poured in and allowed to harden. As is well known, when the shrapnel bursts the most destructively useful pieces are the balls, and the efficiency of a shrapnel of given weight is well measured by the number and remaining energy of the balls it contains.

My invention comprises a shrapnel having balls insured against deformation, the shrapnel itself having a ball-cavity which permits accurate packing or piling of the balls and assures the balls taking up the rotation of the shrapnel, all as I will proceed now more particularly to set forth and finally claim.

Figure 1:
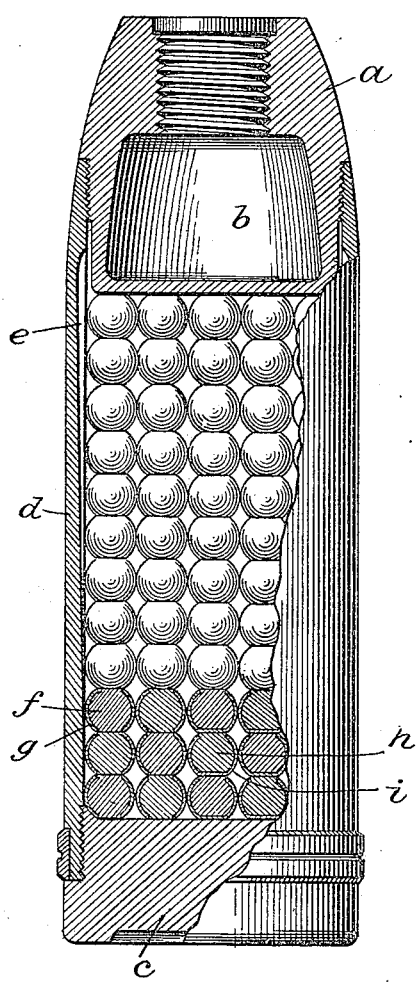
Figure 2:
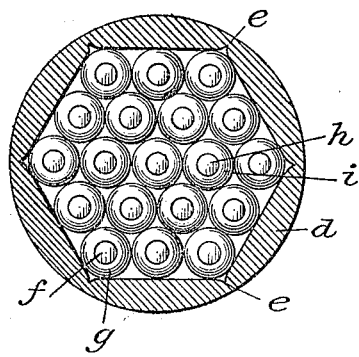

In the accompanying drawings, illustrating my invention, in the several figures of which like parts are similarly designated, Figure 1 is a partial longitudinal section, and Fig. 2 is a horizontal cross-section.

The head *a*, which may be provided with a cavity *b* for containing the bursting charge, and the base *c* may be of any approved construction. The body *d* is of any approved external configuration; but its ball-cavity is polygonal and preferably hexagonal in cross-section, as in Fig. 2—that is to say, this ball-cavity is composed of a series of plane or flat walls which, if bounding a solid, would constitute a prism or prismatic object. The longitudinal meeting edges of these several walls reduce the thickness of the wall of the shell at these points, and thus present natural lines of weakness, and the weakness of these lines may be increased by forming grooves *e* therein, thereby to facilitate and to that extent assure the bursting of the shell. As illustrated in the drawings, and especially in Fig. 2, the balls of a shrapnel constructed with such a cavity may be piled therein in the most advantageous manner to cause the balls to take up the rotation of the shell—in other words, to prevent the independent rotation of the balls. If the balls be made with flattened ends, as shown in the drawings, this piling or packing thereof will be greatly facilitated and endwise movement in the direction of flight will be overcome and the liability to deformation incident to such endwise movement practically removed.

In order to reduce to a minimum the deformation of the balls, I prefer to jacket them, and if the balls be made of lead the jacket should be of strong and stiff material, such as steel. Two forms of such jackets are illustrated in the balls shown in cross-section in the lower part of Fig. 1, the balls *f* having a steel jacket *g* open at both ends and the balls *h* having cupped jackets *i*, and both forms of balls having opposite flattened ends.

Balls constructed as just described enable me to avail of lead balls without material decrease in density, and the strong and stiff metal jackets afford great resistance to deformation by end pressure and also increased penetration after the bursting of the shrapnel. Moreover, this strength of ball enables me to dispense with the separators heretofore used to protect the balls from deformation and to utilize the weight and space thus saved to put more balls in a shrapnel of given weight, thus increasing the efficiency of the shrapnel. The polygonal interior of the ball-cavity serves effectively to cause the balls to take up the rotation of the shrapnel, and, finally, as another advantage of my construction, the polygonal section gives a case or shell with natural longitudinal lines of weakness, which, with or without the grooves e, make the case or shell open readily and thoroughly under the action of the bursting charge to release the balls.

In the drawings the head is shown as containing a cavity for the bursting charge; but it is evident that this charge could be placed in the base if the latter were so shaped as to provide a cavity for it. In this form of construction the center column of balls would be omitted and a hollow central tube inserted in its place to give the necessary communication between fuse and bursting charge. Such details of construction are independent of the principle of my invention, as is the method of producing the case with polygonal interior section. This can be drawn or cast.

What I claim is—

1. A shrapnel, having a prismatic ball-cavity, preferably hexagonal in cross-section, and thereby adapted to receive the balls without the intervention of separators and like supports, substantially as described.

2. A shrapnel, having a prismatic ball-cavity, preferably hexagonal in cross-section, and thereby adapted to receive the balls without separators or a central support, and lead balls having strong and stiff metal jackets, said balls being piled in said cavity in parallel columns and in intimate lateral contact, substantially as described.

In testimony whereof I have hereunto set my hand this 12th day of December, A. D. 1898.

BEVERLY W. DUNN.

Witnesses:
WALTER R. BRONSON,
HENRY W. MINOR.